United States Patent
Shan et al.

(10) Patent No.: US 9,204,307 B2
(45) Date of Patent: Dec. 1, 2015

(54) METHOD AND APPARATUS FOR SWITCHING OPERATIONAL MODES IN A COGNITIVE RADIO SYSTEM

(75) Inventors: Cheng Shan, Suwon-si (KR); Eun-Taek Lim, Suwon-si (KR); Jung-Soo Woo, Suwon-si (KR); Ho-Dong Kim, Gwacheon-si (KR); Sang-Bum Kim, Seoul (KR); Yong-Ho Park, Cheonan-si (KR); Geun-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1433 days.

(21) Appl. No.: 12/613,872

(22) Filed: Nov. 6, 2009

(65) Prior Publication Data
US 2010/0118813 A1    May 13, 2010

(30) Foreign Application Priority Data
Nov. 7, 2008 (KR) .................. 10-2008-0110242

(51) Int. Cl.
*H04W 16/06* (2009.01)

(52) U.S. Cl.
CPC ................... *H04W 16/06* (2013.01)

(58) Field of Classification Search
CPC ................................................... H04W 16/06
USPC .......... 370/436, 437, 447, 461, 462; 455/450, 455/452.1
See application file for complete search history.

(56) References Cited

U.S. PATENT DOCUMENTS

| 5,926,763 | A  | * | 7/1999  | Greene et al. ............... 455/450 |
| 6,496,490 | B1 | * | 12/2002 | Andrews et al. .............. 370/329 |
| 6,788,659 | B1 | * | 9/2004  | Sato ............................ 370/329 |
| 2004/0203828 | A1 | * | 10/2004 | Mirchandani et al. ..... 455/452.1 |
| 2006/0256737 | A1 | * | 11/2006 | Choi et al. .................... 370/254 |
| 2007/0117537 | A1 | * | 5/2007  | Hui et al. ..................... 455/405 |
| 2007/0129080 | A1 | * | 6/2007  | Okuda et al. ............... 455/452.1 |
| 2008/0089280 | A1 | * | 4/2008  | Hu ............................... 370/329 |
| 2008/0214199 | A1 | * | 9/2008  | Ji ............................... 455/452.1 |
| 2010/0087216 | A1 | * | 4/2010  | Ko et al. ....................... 455/500 |
| 2010/0135226 | A1 | * | 6/2010  | Chandramouli et al. ..... 370/329 |

OTHER PUBLICATIONS

Wendong Hu, Efficient, Flexibile, and Scalable Inter NEtwork Spectrum Sharing and Communications in Cognitive IEEE 802.22 Networks, Feb. 14, 2008, STM Electronics Inc, pp. 1-5.*

* cited by examiner

*Primary Examiner* — Christopher Grey
(74) *Attorney, Agent, or Firm* — Jefferson IP Law, LLP

(57) ABSTRACT

A method and apparatus for switching operational modes in a Cognitive Radio (CR) system are provided. A method for switching between a normal operation mode and a coexistence operation mode in a CR system includes occupying at least one channel in the normal operation mode, when there is no channel to be occupied, selecting at least one channel for the coexistence operation mode, and occupying available frames among frames of the selected at least one channel in the coexistence operation mode.

20 Claims, 5 Drawing Sheets

METHOD AND APPARATUS FOR SWITCHING OPERATIONAL MODES IN A COGNITIVE RADIO SYSTEM

PRIORITY

This application claims the benefit under 35 U.S.C. §119(a) of a Korean patent application filed in the Korean Intellectual Property Office on Nov. 7, 2008 and assigned Serial No. 10-2008-0110242, the entire disclosure of which is hereby incorporated by reference.

BACKGROUND OF THE INVENTION

1. Field of the Invention

The present invention relates to a Cognitive Radio (CR) system. More particularly, the present invention relates to a method and apparatus for switching operational modes in a CR system.

2. Description of the Related Art

CR systems scan a spectrum of frequencies in a licensed system, determine which frequencies or channels are not in use and operate using the unused frequencies. When the CR systems have multiple unused channels available for operation, in order to minimize mutual interference with neighboring systems, the CR system tends to select a channel that is different from those used by the neighboring systems. This is referred to as a 'spectrum etiquette mechanism'.

The CR systems exchange basic information such as an operational channel, the availability of channels, spectrum sensing scheduling, etc. through communication between Base Stations (BSs). By acquiring operational channel information on neighboring systems, the CR system selects an operational channel from channels of the neighboring systems. In order to minimize a mutual interference, the CR system has to keep a mutual distance in a frequency domain.

The spectrum etiquette mechanism operates only when there are a plurality of selectable available channels. When there are an insufficient number of available channels, for example, when sensed channels of a licensed band are all occupied by the neighbor systems, a different mechanism is applied to address this scenario.

According to the Institute of Electrical and Electronics Engineers (IEEE)802.22 standard, a channel renting/offering or channel contention mechanism is performed if the spectrum etiquette mechanism fails to provide sufficient spectrum resources. In other words, when the CR system fails to acquire an operational channel by the spectrum etiquette mechanism, the CR system rents a channel already occupied by another neighbor system, or occupies an operational channel through contention. However, the channel renting/offering and channel contention mechanisms are not efficient under the following environment. First, when a BS1 rents a channel from a BS2, this means that, after a negotiated period, the BS1 returns the rented channel to the BS2. This does not coincide with a rule of a license-exempt environment in which a CR system rents and uses a licensed frequency band with another system with the same right/priority. A cell does not possess a specific channel. Therefore, when the BS2 has a plurality of available channels, if the BS1 contends a channel (N) against the BS2 but fails in the contention, the BS2 may keep operating in the channel (N).

Thus, there is a need for a method and apparatus for switching between a channel-based sharing mode and a frame-based sharing mode in a CR system.

SUMMARY OF THE INVENTION

An aspect of the present invention is to address at least the above-mentioned problems and/or disadvantages and to provide at least the advantages described below. Accordingly, an aspect of the present invention is to provide a method and apparatus for switching between a normal operation mode and a coexistence operation mode in a Cognitive Radio (CR) system.

Another aspect of the present invention is to provide a method and apparatus for efficient channel-based sharing and frame-based sharing in a CR system.

The above aspects are addressed by providing a method and apparatus for switching operational modes in a CR system.

In accordance with an aspect of the present invention, a method for switching between a normal operation mode and a coexistence operation mode in a CR system is provided. The method includes occupying at least one channel in the normal operation mode, when there is no channel to be occupied, selecting at least one channel for the coexistence operation mode, and occupying available frames among frames of the selected at least one channel in the coexistence operation mode.

In accordance with another aspect of the present invention, a method for switching between a normal operation mode and a coexistence operation mode in a CR system is provided. The method includes, upon receiving a channel request, identifying if there is a backup channel, and, when there is the backup channel, switching to the backup channel and sending an acceptance response to the channel request.

In accordance with a further aspect of the present invention, an apparatus for switching between a normal operation mode and a coexistence operation mode in a CR system is provided. The apparatus includes a channel selector, a mode switching unit, and a frame selector. The channel selector occupies at least one channel in the normal operation mode. When there is no channel to be occupied, the mode switching unit selects at least one channel for the coexistence operation mode. The frame selector occupies available frames among frames of the selected at least one channel in the coexistence operation mode.

In accordance with still another aspect of the present invention, an apparatus for switching between a normal operation mode and a coexistence operation mode in a CR system is provided. The apparatus includes a channel selector and a controller. Upon receiving a channel request, the channel selector identifies if there is a backup channel. When there is the backup channel, the controller switches to the backup channel and sends an acceptance response to the channel request.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, description of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Below, a description is made of a method and apparatus for switching between a normal operation mode and a coexistence operation mode and a method and apparatus for efficient channel-based sharing and frame-based sharing in a Cognitive Radio (CR) system according to exemplary embodiments of the present invention.

The normal operation mode is a channel-based sharing mode in which one cell or Base Station (BS) uses one entire channel. In the normal operation mode, the cell may transmit data through all frames on a time axis. The coexistence operation mode is an inter-frame sharing mode. In the coexistence operation mode, one or more cells or BSs may occupy one or several frames on a time axis in the same channel, respectively.

Figure 1:
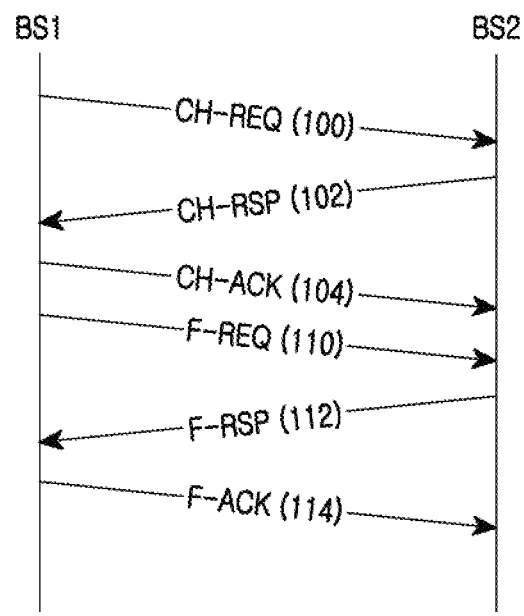
FIG. 1 is a ladder diagram illustrating a message flow for channel-based sharing and frame-based sharing between two Base Stations (BSs) in a Cognitive Radio (CR) system according to an exemplary embodiment of the present invention.

FIG. 1 is a ladder diagram illustrating a message flow for channel-based sharing and frame-based sharing between two BSs in a CR system according to an exemplary embodiment of the present invention.

Referring to FIG. 1, when a BS1 does not have a channel for operation but intends to operate a channel (N), in step 100, the BS1 sends a channel request (CH-REQ) to a neighbor BS2 operating through the channel (N). If the BS2 has another channel for use, that is, a backup channel, in step 102, the BS2 sends a channel response (CH-RSP) consenting to channel (N) release to the BS1. Upon receiving the channel response (CH-RSP), in step 104, the BS1 sends an ACKnowledgement (ACK) or Negative ACKnowledgement (NACK) message for confirming/canceling the released channel (N) from the BS2. In other words, the BS1 sends the ACK message to the BS2 to inform the BS2 of its intent to use the channel (N) as an operational channel, or sends the NACK message to the BS2 to inform the BS2 of its intent not to use the channel (N). Though not illustrated, upon receiving the ACK message from the BS1, the BS2 transitions into use of the backup channel before a negotiated time. Accordingly, the BS1 may start using the channel (N) after the negotiated time.

When receiving the channel request from the BS1 in step 100, if the BS2 does not possess a backup channel, the BS2 may send a channel response (CH-RSP) rejecting the channel request to the BS1. Upon receiving the rejection response from the BS2, the BS1 may transmit another channel request to another BS. Upon a failure to acquire the channel requested from the other BS, in step 110 the BS1 sends a frame request (F-REQ) to the BS2 for frame-based sharing. In step 112, the BS2 sends a frame response (F-RSP) to the frame request (F-REQ) to the BS1. If receiving the frame response (F-RSP), in step 114 the BS1 sends an ACK or NACK message of confirming/canceling a requested frame from the BS2.

Table 1 below shows a format of a CH-REQ (or F-REQ) message, Table 2 below shows a format of a CH-RSP (or F-RSP) message, and Table 3 below shows a format of a CH-ACK (or F-ACK) message.

TABLE 1

| Syntax | Size | Notes |
| --- | --- | --- |
| CH_REQ (F_REQ)_Format( ) { | | |
| Source BS ID | 48 bits | Indicates the BS ID of the requesting BS. |
| List of Destination BS IDs (Optional) | var | Indicates the destination BS IDs to whom this request is sent. |
| Channel (frame) Number in Request | 8(4) bits | Indicates the channel (frame) requested by the present message. |
| Time to release the channel (frame) | 8 bits | Indicates the requested time that the destination(s) should release the channel (frame). |
| } | | |

The CH-REQ (or F-REQ) message includes information on a source BS IDentifier (ID) indicating the BS that is requesting a channel or frame, information on a list of destination BS(s) that are receiving the channel or frame request, the channel or frame number requested, information on a time to release the channel or frame, etc.

TABLE 2

| Syntax | Size | Notes |
| --- | --- | --- |
| CH_RSP (F_RSP)_Format( ) { | | |
| Destination BS ID | 48 bits | Indicates the destination BS ID that sent this message. |
| Source BS ID | 48 bits | Indicates the source BS ID to whom this response is sent. |
| Channel (frame) Number in Request | 8 bits | Indicates to which channel (frame) the present message is related. |

TABLE 2-continued

| Syntax | Size | Notes |
| --- | --- | --- |
| Response Type | 1 bit | Indicates the result of the request.<br>0: REJECT<br>1: SUCCESS |
| } | | |

The CH-RSP (or F-RSP) message includes information on a destination BS ID indicating the BS that received the channel or frame request, information on a source BS ID indicating the BS that requested the channel or frame, the channel or frame number requested, response type information, etc.

TABLE 3

| Syntax | Size | Notes |
| --- | --- | --- |
| CH_ACK (F_ACK)_Format( ) { | | |
| Source BS ID | 48 bits | Indicates the source BS ID that sent this message. |
| Destination BS ID (Optional) | var | Indicates the destination BS IDs to whom this responsе is sent. |
| Channel (frame) Number in Request | 8 bits | Indicates to which channel (frame) the present message is related. |
| Acknowledgement Type | 1 bit | Indicates the result of the request.<br>0: NACK<br>1: ACK |
| } | | |

The CH-ACK (or F-ACK) message includes information on a source BS ID indicating the BS that requested the channel or frame, information on a destination BS ID indicating the BS that received the channel or frame request, the channel or frame number requested, ACK type information, etc.

In an exemplary embodiment of the present invention as illustrated in FIG. 1, a description of inter-channel or frame sharing between two BSs has been made. However, a channel or frame can be occupied by one or more neighbor BSs.

Figure 2:
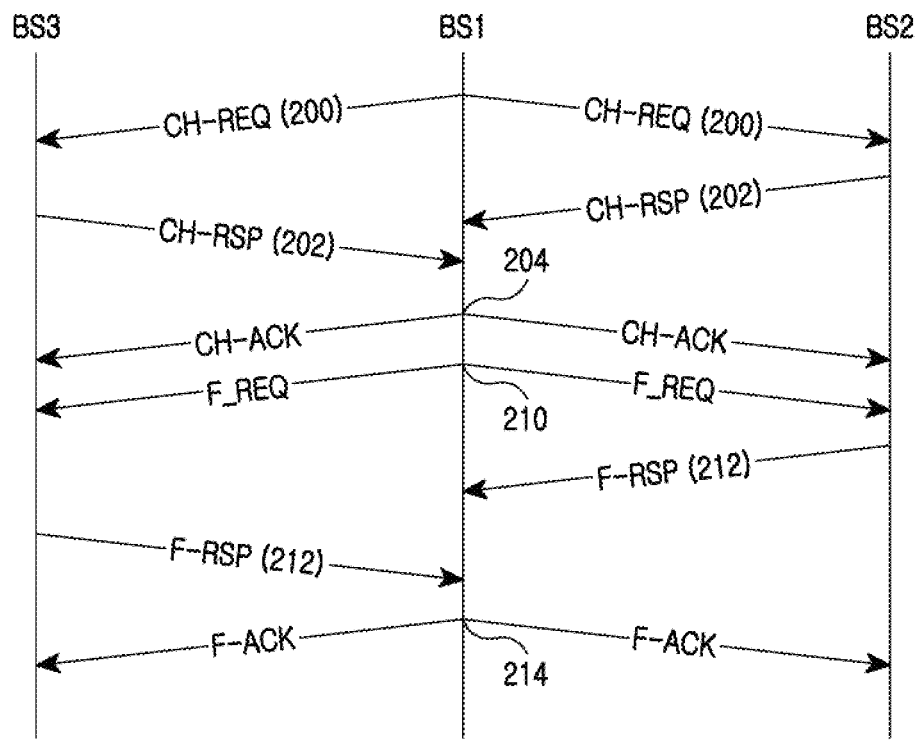
FIG. 2 is a ladder diagram illustrating a message flow for channel-based sharing and frame-based sharing when one or more neighbor BSs occupy a channel or frame in a CR system according to an exemplary embodiment of the present invention.

FIG. 2 is a ladder diagram illustrating a message flow for channel-based sharing and frame-based sharing when one or more neighbor BSs occupy a channel or frame in a CR system according to an exemplary embodiment of the present invention. In the following description, two BSs are designated as neighbor BSs. However, this number of neighbor BSs is merely for convenience of description and is not considered a limitation on application of the present invention. That is, the number of neighbor BSs could just as well be three or more.

Referring to FIG. 2, when a BS1 does not have a channel for operation but intends to operate a channel (N), in step 200, the BS1 sends, by multicasting or broadcasting, channel requests (CH-REQ) to neighbor BS2 and BS3 operating through the channel (N). If each of the BS2 and the BS3 has another channel that can be used rather than channel N, that is if each of BS2 and BS3 has a backup channel, in step 202, the BS2 and the BS3 each send channel responses (CH-RSP) consenting to channel (N) release, to the BS1. Upon receiving the channel responses from all neighbor BSs (i.e., the BS2 and the BS3), in step 204, the BS1 sends ACK or NACK messages to confirm or cancel use of the released channel (N) from the BS2 and the BS3. In other words, the BS1 sends the ACK messages to the BS2 and the BS3 to inform the BS2 and the BS3 of its intent to use the channel (N) as an operational channel, or sends the NACK messages to the BS2 and the BS3 to inform the BS2 and the BS3 of its intent not to use the channel (N). Though not illustrated, when receiving the ACK messages from the BS1, the BS2 and the BS3 transition into use of the backup channels before a negotiated time. The BS1 may begin use of the channel (N) after the negotiated time.

When receiving the channel requests from the BS1 in step 200, if the BS2 and the BS3 do not possess backup channels, the BS2 and the BS3 may send channel responses (CH-RSP) rejecting the channel requests to the BS1. Upon receiving at least one or more rejection responses from neighbor BSs (i.e., the BS2 and/or the BS3), the BS1 may send a request for another channel to another BS. Upon failure to acquire even the channel requested from the other BS, in step 210, the BS1 sends frame requests (F-REQ) to the BS2 and the BS3 for frame-based sharing. In step 212, the BS2 and the BS3 send frame responses (F-RSP) to the frame requests (F-REQ), to the BS1. If the BS1 receives the frame responses (F-RSP), in step 214 the BS1 sends ACK or NACK messages to confirm or cancel use of the requested frames from the BS2 and the BS3.

As described above, a source BS needing a spectrum resource (e.g., a channel) performs a spectrum etiquette mechanism and, upon a failure of the spectrum etiquette mechanism, the source BS may send channel requests to destination BSs possessing at least another backup channel. If all of the destination BSs do not possess a backup channel, the source BS may trigger a frame-based sharing/spectrum sharing mechanism and start inter-frame sharing with neighbor BSs.

Figure 3:
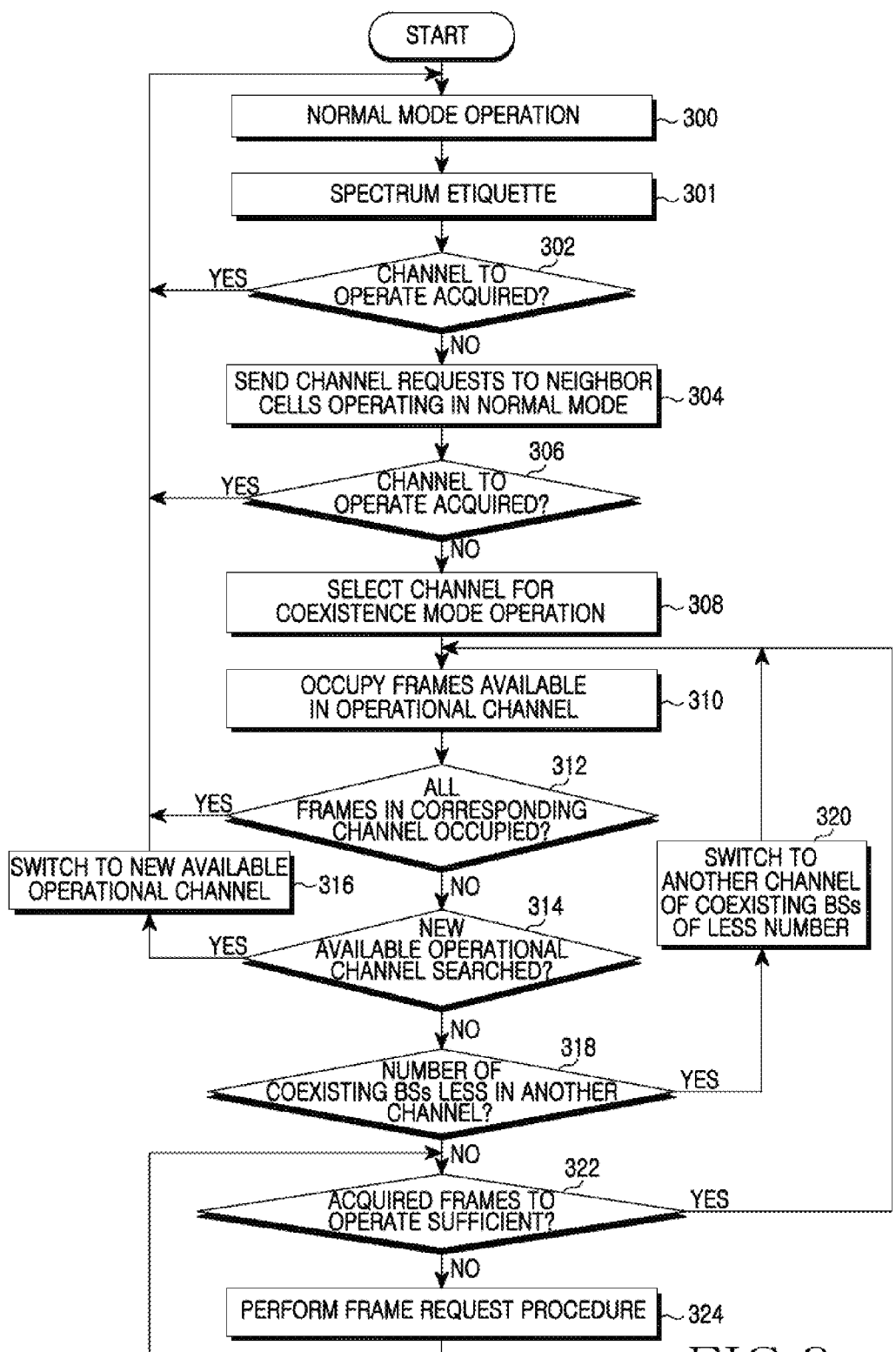
FIG. 3 is a flowchart illustrating an operation of a source BS for switching between a normal operation mode and a coexistence operation mode in a CR system according to an exemplary embodiment of the present invention.

FIG. 3 is a flowchart illustrating an operation of a source BS for switching between a normal operation mode and a coexistence operation mode in a CR system according to an exemplary embodiment of the present invention.

Referring to FIG. 3, in step 300, the source BS operates in a normal operation mode.

In step 301, the source BS performs a spectrum etiquette mechanism. The spectrum etiquette mechanism is performed to, after a spectrum is scanned to detect a licensed system and other coexisting CR systems, select an operational channel that may minimize interference with the licensed system and other coexisting CR systems. Also, in order to enable quick switching when there is a need for channel switching, the spectrum etiquette mechanism may maintain a backup channel set including a blank channel list. During operation, the source BS may continue scanning not only a backup channel but also an operational channel and, when the operational channel is not available or an operational channel is required as a result of a coexistence mechanism, perform the channel switching.

In step 302, the source BS determines if there is a channel on which to operate based on a result of the spectrum etiquette mechanism. If the source BS determines that it has failed to acquire an operational channel, the source BS proceeds to step 304 and sends channel requests to neighbor destination BSs operating in a normal operation mode. On the contrary, if the source BS determines that it has acquired the operational channel, the source BS proceeds to step 300 and maintains the normal mode operation.

If the source BS fails to acquire an operational channel after performing the spectrum etiquette mechanism, the conventional art uses a channel renting/offering and channel contention mechanism. At this time, even though a destination BS possesses a backup channel, there is a probability that the destination BS will reject the channel request of the source BS. More particularly, in a channel renting/offering mechanism, the source BS has to return a channel after a preset time. This is contrary to a fairness based rule of having to be operated under a license-exempt environment of sharing and using a licensed frequency band. That is, all CR systems have the same right/priority to use a spectrum.

In exemplary embodiments of the present invention, if a source BS sends channel requests to destination BSs as in step 304, when the destination BSs receiving the channel requests possess their own backup channels, the destination BSs switch to their own backup channels, respectively, and release a requested corresponding channel, thus enabling the source BS to occupy the corresponding channel.

In step 306, the source BS determines if it has acquired an operational channel through the channel request of step 306. If the source BS determines that it has acquired an operational channel, the source BS proceeds to step 300 and maintains the normal operation mode. On the contrary, if the source BS determines that it has failed to acquire the operational channel through the channel request, i.e., when all channels are occupied by a licensed system and coexisting CR systems, the source BS proceeds to step 308 and selects a channel for a coexistence operation mode. For example, it is desirable to select one channel, occupied by the fewest number of BSs, from among channels occupied by the neighbor destination BSs. In an exemplary implementation, the source BS may select at least one or more channels for the coexistence operation mode.

Then, the source BS proceeds to step 310 and occupies frames available in the selected operational channel.

That is, when failing to acquire the operational channel through the channel request in step 306, the source BS switches to the coexistence operation mode and sends a frame request for one or a plurality of frames of the selected operational channel, occupying at least one or more frames. Alternatively, the source BS continues sending a channel request for another channel before sending a frame request (not shown).

According to another exemplary embodiment of the present invention, in order for neighbor BSs to be informed of not only their own operational channels but also backup channel lists, coexisting BSs periodically broadcast their own backup channel lists. Thus, the source BS can send a channel request using the broadcasted backup channel lists of the neighbor BSs. If neighbor cells do not possess backup channels, the source BS may select one channel and directly send frame request messages.

The following description is made of an exemplary embodiment of again transiting to the normal mode operation of step 300 from the coexistence operation mode of occupying and using at least one or more frames of step 310.

If the source BS that is in the coexistence operation mode determines that it occupies all frames in the selected operational channel in step 312, the source BS proceeds to step 300 and switches to the normal operation mode that uses the selected operational channel. If the source BS determines in step 312 that it does not occupy all frames in the selected operation channel, the source BS proceeds to step 314.

In the coexistence operation mode, coexisting BSs may continue performing spectrum scanning to identify if redundancy channels are available. If the source BS determines that a new available operational channel is detected through spectrum scanning in step 314, the source BS, being in the coexistence operation mode, proceeds to step 316 and switches to the detected new available operational channel and then proceeds to step 300 and operates in the normal operation mode.

Alternatively, if the source BS determines that a new available operational channel is not detected through the spectrum scanning in step 314, the source BS proceeds to step 318 to determine if there is another channel in which fewer BSs coexist than the number of coexisting BSs of the selected operational channel. If the source BS determines in step 318 that there is another channel in which fewer BSs coexist, the source BS, being in the coexistence operation mode, proceeds to step 320 and switches to the other channel of the coexisting BSs of fewer number and then operates in the coexistence operation mode.

On the other hand, if the source BS, being in the coexistence operation mode, determines in step 318 that there is not another channel in which fewer BSs coexist than the number of coexisting BSs of the selected operational channel, the source BS proceeds to step 322 and determines if the number of acquired frames is sufficient for operation. If the source BS determines in step 322 that additional frame resources are necessary, the source BS proceeds to step 324 and performs a frame request procedure and occupies a frame. The frame request procedure acquires a frame through frame renting/offering and/or frame contention. After that, the source BS returns to step 322. On the other hand, if the source BS determines in step 322 that additional frame resources are not necessary, the source BS proceeds to step 310 and performs the subsequent processes.

Figure 4:
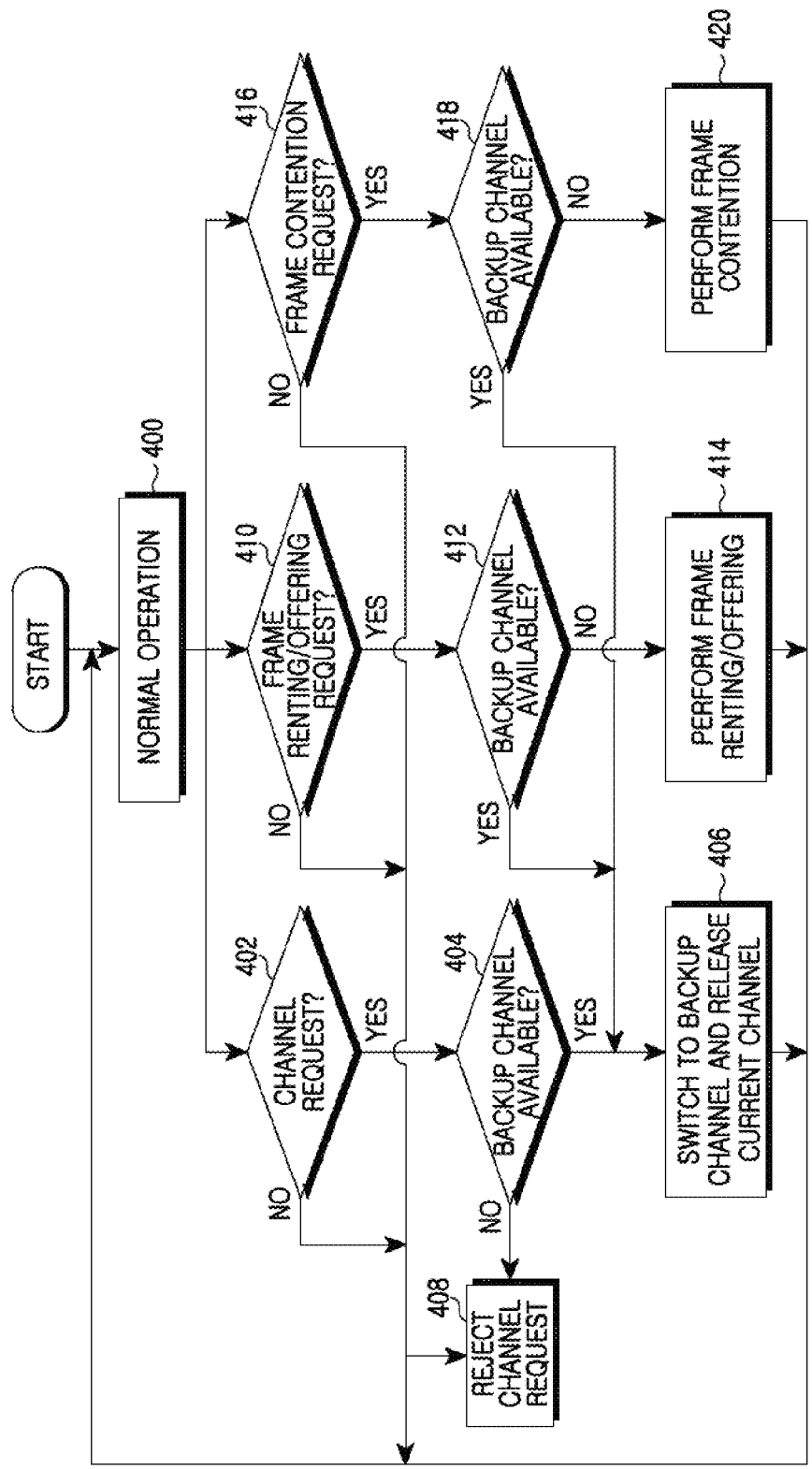
FIG. 4 is a flowchart illustrating an operation of a destination BS for switching between a normal operation mode and a coexistence operation mode in a CR system according to an exemplary embodiment of the present invention.

FIG. 4 is a flowchart illustrating an operation of a destination BS for switching between a normal operation mode and a coexistence operation mode in a CR system according to an exemplary embodiment of the present invention.

Referring to FIG. 4, in step 400, in a normal operation mode, a destination BS operates through one channel comprised of all available frames. When receiving a channel request from a source BS in step 402, the destination BS being in the normal operation mode proceeds to step 404 and determines if at least one or more backup channels are available. If it is determined in step 404 that at least one backup channel is available, the destination BS proceeds to step 406 where it releases the channel requested by the source BS and switches to another channel. On the contrary, if it is determined in step 404 that there is not an available backup channel, the destination BS proceeds to step 408 and rejects the channel request.

Referring again to step 400, in a channel-based normal operation mode or frame-based coexistence operation mode, if receiving a frame request message requesting frame renting/offering from the source BS in step 410, the destination BS proceeds to step 412 and determines if at least one backup channel is available. If it is determined in step 412 that at least one backup channel is available, the destination BS proceeds to step 406 where it switches to the available channel and releases a currently used channel such that the source BS may use the released channel. On the contrary, if it is determined in step 412 that the backup channel is not available, the destination BS proceeds to step 414 and performs a frame renting/offering mechanism.

Referring again to step 400, in the channel-based normal operation mode or frame-based coexistence operation mode, if receiving a frame request message requesting frame contention from the source BS in step 416, the destination BS proceeds to step 418 and determines if at least one backup channel is available. If it is determined in step 416 that at least one backup channel is available, the destination BS proceeds to step 406 where it switches to the available channel and releases a currently used channel such that the source BS may use the released channel. On the contrary, if it is determined in step 416 that the backup channel is not available, the destination BS proceeds to step 420 and performs a frame contention mechanism.

Figure 5:
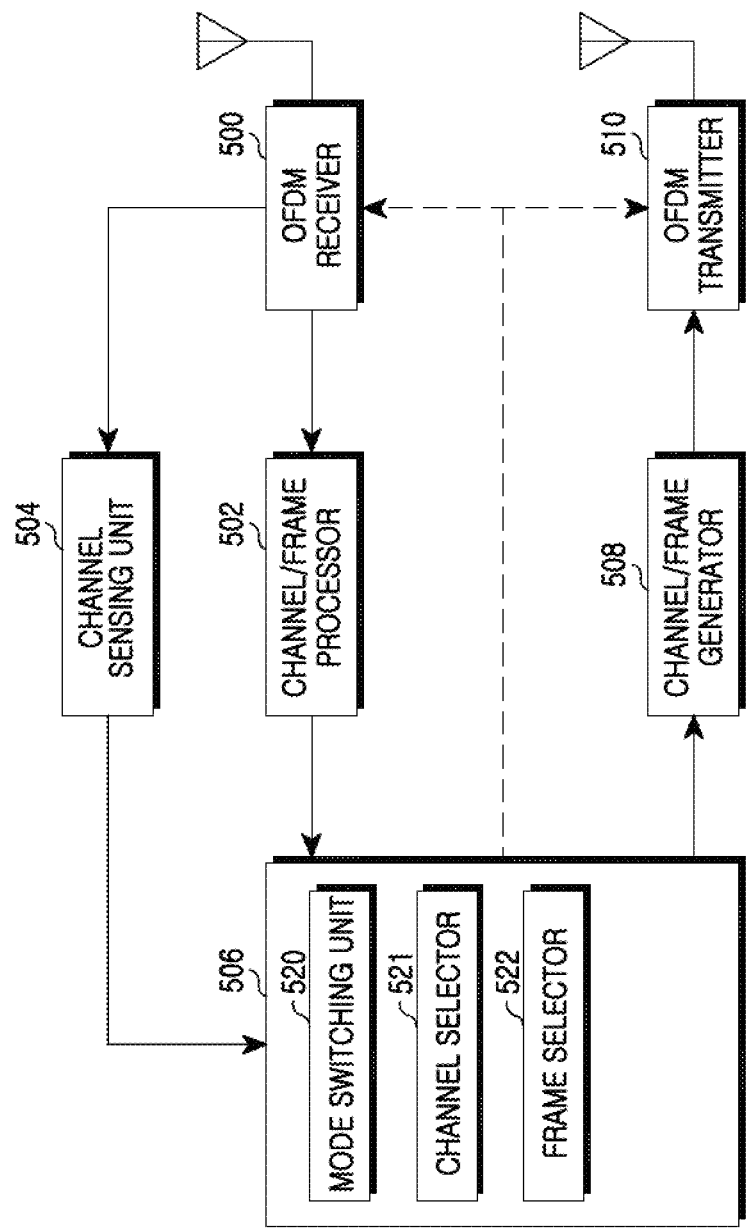
FIG. 5 is a block diagram illustrating a construction of an apparatus for switching between a normal operation mode and a coexistence operation mode in a CR system according to an exemplary embodiment of the present invention.

FIG. 5 illustrates a construction of an apparatus for switching between a normal operation mode and a coexistence operation mode in a CR system according to an exemplary embodiment of the present invention.

Referring to FIG. 5, the apparatus includes an Orthogonal Frequency Division Multiplexing (OFDM) receiver 500, a channel/frame processor 502, a channel sensing unit 504, a controller 506, a channel/frame generator 508, and an OFDM transmitter 510.

The OFDM receiver 500 converts a Radio Frequency (RF) signal received from a neighbor BS or Mobile Station (MS) into a baseband signal, converts the baseband analog signal into digital sample data, and outputs the digital sample data. Also, the OFDM receiver 500 OFDM-demodulates sample data and outputs subcarrier values. Here, the OFDM demodulation represents inclusion of Cyclic Prefix (CP) removal, a Fast Fourier Transform (FFT) operation, etc.

The channel/frame processor 502 processes data based on a channel/frame received from the OFDM receiver 500 and provides the result to the controller 506. That is, the channel/frame processor 502 processes channel-based or frame-based data under the control of the controller 506.

The controller 506 performs a general control of a BS, performs a corresponding process for information provided from the channel/frame processor 502 and provides the result to the channel/frame generator 508.

In addition, the controller 506 determines whether to operate in a mode from among a normal operation mode and a coexistence operation mode, and performs switching between the two modes. The controller 506 selects a channel through a channel request/channel response in the normal operation mode, and selects a frame through a frame request/frame response in the coexistence operation mode. For this, the controller 506 includes a mode switching unit 520, a channel selector 521, and a frame selector 522.

In an operation of a source BS, the mode switching unit 520 switches from a normal operation mode to a coexistence operation mode, or from the coexistence operation mode to the normal operation mode considering a channel occupation state or a frame occupation state. When there is no occupied channel, the mode switching unit 520 selects at least one or more channels for the coexistence operation mode.

In the normal operation mode, the channel selector 521 occupies at least one or more channels.

In the coexistence operation mode, the frame selector 522 occupies available frames among frames of the selected at least one or more channels.

The channel selector 521 senses a channel not used in a neighbor cell and acquires at least one or more available channels. When all channels are used in the neighbor cell, the channel selector 521 sends a channel request to the neighbor cell according to a preset pattern and, upon receiving an acceptance response to the channel request from the neighbor cell, occupies a requested channel and maintains the normal operation mode.

Upon receiving at least one or more rejection responses to the channel request from the neighbor cell, the controller 506 can switch to the coexistence operation mode, or select another channel and send a channel request. When occupying all frames of the selected at least one or more channels, the frame selector 521 switches to the normal operation mode.

In the coexistence operation mode, when a new available channel is detected, the channel selector 521 switches to the new available channel and maintains the normal operation mode.

In the coexistence operation mode, when there is another channel of coexisting cells of a number less than those of the selected at least one or more channels, the frame selector 522 switches to the other channel of the coexisting cells of fewer number and occupies a frame.

In the coexistence operation mode, if the number of occupied available frames is insufficient, the controller 506 performs a frame request procedure. The frame request procedure occupies a frame through frame renting/offering and/or frame contention.

According to another exemplary embodiment of the present invention, the channel selector 521 receives an operational channel and a backup channel list from a neighbor cell, sends a channel request to the neighbor cell with reference to the operational channel and the backup channel list and, upon all receiving an acceptance response to the channel request from the neighbor cell, occupies a requested channel and maintains the normal operation mode.

In an operation of a destination BS, upon receiving a channel request, the channel selector 521 identifies if there is a backup channel.

When there is the backup channel, the controller 506 switches to the backup channel and sends an acceptance response to the channel request.

Furthermore, when there is the backup channel, the controller 506 releases the requested channel. When there is no backup channel, the controller 506 sends a rejection in response to the channel request.

Upon receiving a frame request in the normal operation mode and/or coexistence operation mode, the channel selector 521 identifies if there is a backup channel. If there is the backup channel, the channel selector 521 switches to the backup channel and sends an acceptance response to the frame request.

Furthermore, when there is the backup channel, the controller 506 releases a requested frame. When there is no backup channel, the controller 506 sends a rejection in response to the frame request.

The channel sensing unit 504 scans channels of a licensed band and provides sensed channel information to the controller 506.

The channel/frame generator 508 configures various kinds of information provided from the controller 506 in an occupied corresponding channel/frame region and outputs the information to the OFDM transmitter 510 of a physical layer.

The OFDM transmitter 510 codes and modulates data received from the channel/frame generator 508 according to a modulation level (i.e., a Modulation and Coding Scheme (MCS) level). In addition, the OFDM transmitter 510 processes, by Inverse Fast Fourier Transform (IFFT), the modulated data and outputs sample data (i.e., an OFDM symbol). Also, the OFDM transmitter 510 converts the sample data into an analog signal, converts the analog signal into an RF signal, and transmits the RF signal through an antenna.

As described above, an exemplary embodiment of the present invention can perform efficient channel-based sharing and frame-based sharing by switching between a normal operation mode and a coexistence operation mode in a CR system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operation method of a source base station in a Cognitive Radio (CR) system, the operation method comprising:

occupying at least one channel in a first mode based on an operation channel and a backup channel of a neighbor cell;

selecting at least one channel for a second mode when there is no channel to be occupied; and occupying available frames among frames of the selected at least one channel in the second mode based on a frame request, wherein the backup channel comprises a channel for channel switching in which a target base station releases the operation channel and replaces the released operation channel with the backup channel, if the source base station transmits a channel request to the target base station, wherein the first mode comprises a mode in which a plurality of frames of any channel is occupied by one base station, and wherein the second mode comprises a mode in which a plurality of frames of any channel is shared by at least two base stations.

2. The operation method of claim 1, wherein the occupying of the at least one channel in the first mode comprises:

sensing a channel not used in a neighbor cell and acquiring at least one available channel;

sending a channel request to the neighbor cell, when using all channels in the neighbor cell; and occupying a requested channel and maintaining the first mode, when receiving an acceptance response to the channel request from the neighbor cell.

3. The operation method of claim 2, further comprising at least one of switching to the second mode and sending a channel request for another channel when receiving at least one rejection response to the channel request from the neighbor cell.

4. The operation method of claim 1, further comprising switching to the first mode when all frames of the selected at least one channel are occupied.

5. The operation method of claim 1, further comprising switching to the new available channel and maintaining the first mode when a new available channel is detected in the second mode.

6. The operation method of claim 1, further comprising:

determining if there is another channel used by a fewer number of coexisting cells than the number of coexisting cells of the selected at least one channel in the second mode; and switching to the other channel used by the fewer number of coexisting cells and occupying a frame when it is determined that there is the other channel used by a fewer number of coexisting cells.

7. The operation method of claim 1, further comprising, if a number of occupied available frames is not enough in the second mode, performing a frame request procedure.

8. The operation method of claim 7, wherein the frame request procedure occupies a frame through at least one of frame renting, frame offering and frame contention.

9. The operation method of claim 1, wherein the occupying of the at least one channel in the first mode comprises:

receiving an operation channel and a backup channel list from a neighbor cell;

sending a channel request to the neighbor cell with reference to the operational channel and the backup channel list; and occupying a requested channel and maintaining the first mode, when receiving an acceptance response to the channel request from the neighbor cell.

10. A source base station in a Cognitive Radio (CR) system, the source base station comprising:

a channel selector for occupying at least one channel in a first mode based on an operation channel and a backup channel of a neighbor cell;

a mode switching unit for selecting at least one channel for a second mode when there is no channel to be occupied; and a frame selector for occupying available frames among frames of the selected at least one channel in the second mode based on a frame request, wherein the backup channel comprises a channel for channel switching in which a target base station releases the operation channel and replaces the released operation channel with the backup channel, if the source base station transmits a channel request to the target base station, wherein the first mode comprises a mode in which a plurality of frames of any channel is occupied by one base station, and wherein the second mode comprises a mode in which a plurality of frames of any channel is shared by at least two base stations.

11. The source base station of claim 10, wherein the channel selector senses a channel not used in a neighbor cell and acquires at least one available channel, sends a channel request to the neighbor cell when using all channels in the neighbor cell, and occupies a requested channel and maintains the first mode when receiving an acceptance response to the channel request from the neighbor cell.

12. The source base station of claim 11, wherein the channel selector at least one of switches to the second mode and sends a channel request for another channel when receiving at least one rejection response to the channel request from the neighbor cell.

13. The source base station of claim 10, wherein the channel selector switches to the first mode when all frames of the selected at least one channel are occupied.

14. The source base station of claim 10, wherein the channel selector switches to the new available channel and maintains the first mode when a new available channel is detected in the second mode.

15. The source base station of claim 10, further comprising a frame selector for determining if there is another channel used by a fewer number of coexisting cells than the number of coexisting cells of the selected at least one channel in the second mode and for switching to the other channel used by the fewer number of coexisting cells and occupying a frame when it is determined that there is the other channel used by a fewer number of coexisting cells.

16. The source base station of claim 10, further comprising a controller for, if a number of occupied available frames is not enough in the second mode, performing a frame request procedure.

17. The source base station of claim 16, wherein the frame request procedure occupies a frame through at least one of frame renting, frame offering and frame contention.

18. The source base station of claim 10, wherein the channel selector receives an operation channel and a backup channel list from a neighbor cell, sends a channel request to the neighbor cell with reference to the operational channel and the backup channel list, and occupies a requested channel and maintains the first mode when receiving an acceptance response to the channel request from the neighbor cell.

19. The operation method of claim 1, wherein the operation channel comprises a channel corresponding to the channel request.

20. The source base station of claim 10, wherein the operation channel comprises a channel corresponding to the channel request.

* * * * *